United States Patent [19]

Burba et al.

[11] 3,773,595
[45] Nov. 20, 1973

[54] METHODS OF ADHERING AND COATING WITH REACTIVE MIXTURES OF POLYESTERS AND POLYISOCYANATES

[75] Inventors: Christian Burba, Luenen; Eugen Griebsch, Unna; Bernhard Krieger, Bergkamen, all of Germany

[73] Assignee: Schering AG., Berlin and Bergkamen, Germany

[22] Filed: June 18, 1971

[21] Appl. No.: 154,598

[30] Foreign Application Priority Data
June 23, 1970 Germany............... P 20 32 297.8

[52] U.S. Cl............ 156/332, 117/161 KP, 156/327, 260/77.5 AN
[51] Int. Cl. .............................................. C09j 3/14
[58] Field of Search.................... 156/332, 327; 260/858, 77.5 AN; 117/161 KP

[56] References Cited
UNITED STATES PATENTS

| 3,708,333 | 1/1973 | Carlson.................. 117/161 KP |
| 3,226,354 | 12/1965 | Heiss....................... 260/77.5 |
| 3,490,987 | 1/1970 | Bauriedel................. 260/77.5 |
| 3,684,639 | 8/1972 | Keberle et al............ 260/77.5 |
| 3,658,939 | 4/1972 | Carpenter et al......... 260/858 |
| 3,660,357 | 5/1972 | Rolycheck................ 260/858 |

Primary Examiner—William D. Martin
Assistant Examiner—Janyce A. Bell
Attorney—Curtis, Morris & Safford

[57] ABSTRACT

Methods of adhering materials, particularly rubbers or chlorine-containing synthetic resins, with a contact adhesive comprising a reactive mixture of an aromatic polyisocyanate and either a polyester, containing hydroxy groups, prepared from alcohols having two or three hydroxy groups and from poly-omega hydroxy caproic acid and/or epsilon caprolactone, or a prepolymer formed between an excess of such a polyester and an aromatic polyisocyanate. Methods of adhering or coating materials with a mixture of an aromatic polyisocyanate, a prepolymer as described above, and a catalyst for forming urethane bonds.

9 Claims, No Drawings

METHODS OF ADHERING AND COATING WITH REACTIVE MIXTURES OF POLYESTERS AND POLYISOCYANATES

The present invention relates to methods for adhering and coating materials, particularly flexible materials, with reactive mixtures of polyesters and polyisocyanates. More in particular, the invention relates to adhering natural and synthetic rubbers and other flexible synthetic resin compositions with such mixtures, and also to coating flexible substrates such as cloth with cross-linked products of such mixtures.

Combinations of polyesters containing hydroxy groups with polyisocyanates, optionally in a solvent, have been used in the prior art for adhering the most diverse substrate materials such as wood, metal, leather, and textiles. The polyesters containing hydroxy groups are formed from dicarboxylic acids with predominantly divalent alcohols. The disadvantage of these useful adhesives is that they do not possess sufficient adhesive strength for the adhesion of certain flexible resins such as plasticized polymers containing chlorine, particularly polyvinyl chloride.

The present specification teaches adhesive compositions which overcome this disadvantage, i.e., compositions adaptable to adhering flexible resin compositions such as chlorine-containing polymers, particularly plasticized polyvinyl chloride, or rubbers, to each other or to other materials. The compositions comprise mixtures of polyesters containing hydroxy groups — and which may also contain urethane groups — with polyisocyanates. More in particular, the compositions comprise (A) polyesters containing hydroxy groups and having hydroxy numbers from about 35 to about 190, preferably from about 50 to about 160 with (B) at least an equivalent amount, and up to an excess of 50 percent (calculated on the hydroxy number of the polyester), of an aromatic polyisocyanate, i.e., a diisocyanate and/or triisocyanate. These reactive adhesive mixtures, per se or in a volatile solvent, are applied to one or both of the surfaces to be adhered, and the surfaces are then joined. The surfaces adhere on contact; conveniently pressure may be applied to assure contact and/or to improve bonding.

The hydroxy polyesters (A) and (1) esterified (including transesterified) products of, on the one hand, (a) poly-omega-hydroxy caproic acid; or of (b) polyesters of epsilon-caprolactone and (as initiators) aliphatic hydroxy carboxylic acids or hydroxy carboxylic acid esters; or of (c) mixtures of (a) or (b) with aliphatic or aromatic dicarboxylic acids; with, on the other hand, suitable amounts (depending on the desired hydroxy number) of di-hydroxy or tri-hydroxy alcohols or of mixtures thereof. The hydroxy polyesters may also be (2) polyesters of epsilon-caprolactone and (as initiators) alcohols having two or three hydroxy groups and which may also contain ester groups; or (3) mixtures of the polyesters according to (1) and (2); or (4) prepolymers formed between polyesters according to (1) – (3) and a stoichiometric deficiency of an aromatic diisocyanate or triisocyanate.

A major content of epsilon-caprolactone in the polyester, that is at last about 50 percent by weight of the total polyester, is critical for obtaining the desired adhesive properties in polyester containing hydroxy groups which are to be used according to the present invention.

The epsilon-caprolactone may be introduced into the polyester [according to (1) (a)] in the form of poly-omega-hydroxy caproic acid which is esterified with an excess of said divalent of trivalent alcohol. Poly-omega-hydroxy caproic acid may be prepared, for example, according to published German Pat. application Ser. No. DOS 1,914,068. It makes no difference to the adhesive properties whether two mols of poly-omega-hydroxy caproic acid (for example, of a molecular weight of 600) are reacted with one mol of a diol in the preparation of the polyester containing hydroxy groups, or if one mol of a higher molecular weight poly-omega-hydroxy caproic acid (for example of a molecular weight of 1,200) is esterified with one mol of a diol or triol.

If an aliphatic hydroxy carboxylic acid or its methyl or ethyl ester is used [according to (1) (b)] as an initiator instead of water, and epsilon-caprolactone is polymerized in the presence of suitable catalysts, a long-chain polyhydroxy carboxylic acid or polyhydroxy carboxylic acid ester, whose molecular weight is between 500 and 1,500, is obtained. After esterification (including trans-esterification) of this resulting product with said divalent or trivalent alcohol, or mixtures thereof, polyester polyols are obtained. The hydroxy carboxylic acids used are compounds such as lactic acid, hydroxybutyric acid, hydroxy-caproic acid, hydroxy-stearic acid, etc. Because of the excess of epsilon-caprolactone generally used, the influence of the initiator on the properties of the polyester containing hydroxy groups is of minor significance.

Also, according to (1) (c), mixtures of aliphatic or aromatic dicarboxylic acids with long-chain poly-omega-hydroxy-caproic acids or poly-omega-hydroxy-caproic acid esters having a molecular weight between 500 and 1,500 and prepared either with water-initiation or hydroxy-carboxylic acid-initiation produce polyesters containing hydroxy groups by transesterification in the presence of conventional esterification catalysts such as p-toluene sulfonic acid or in the presence of transesterification catalysts arising from the lactone polymerization.

The choice of the molar relationships between the acidic and alcoholic reactants described above must be such as to give the desired hydroxy number of about 35 to about 190. Thus, for example, by esterification of poly-omega-hydroxy-caproic acid of a molecular weight of 1,240, adipic acid, and hexanediol-1,6 in the mol relationship 1:1:2, a polyester having an hydroxy number of about 53 is obtained. By esterification of a poly-omega-hydroxy-caproic acid having a molecular weight of 1,230, isophthalic acid, and hexanediol-1,6 in a mol ratio of 2:1:2, a polyester having a hydroxy number of 37 is produced.

As aliphatic co-dicarboxylic acids, those dicarboxylic acids having from two to 19 carbon atoms are employed. In addition to linear dicarboxylic acids, branched materials such as trimethyl adipic acid (an isomeric mixture of the 2,2,4- and 2,4,4-isomers) can be employed. Further examples of such materials are 1,9(10)-heptadecanedicarboxylic acid as well as those dimeric fatty acids which are obtained by the dimerization of unsaturated fatty acids. Short-chained dicarboxylic acids are preferred since when they are used the polycaproic acid component, which determines the properties of the final product, predominates in an advantageous manner.

As the divalent and trivalent alcohols employed in the esterifications, those diols having from two – 12 carbon atoms, preferably from four to nine carbon atoms, are employed. Such materials include, for example, ethylene glycol; butane-diol-1,4; hexanediol-1,6; trimethyl hexanediol-1,6 (an isomeric mixture of 2,2,4- and the 2,4,4-isomers). As triols, materials such as hexanetriol-1,2,6; butanetriol-1,2,4; and trimethylolpropane can be mentioned, for example.

If divalent or trivalent alcohols or their mixtures are employed as initiators for the polymerization of epsilon-caprolactone [according to (A) (2)], instead of water or hydroxy carboxylic acids, polyesters with terminal hydroxy groups having the desired hydroxy number between about 35 and about 190 are obtained, depending on the mol ratio of caprolactone to hydroxy compound. Short-chain polyesters containing hydroxy groups can also be used as such alcohols with similar good results, for example the condensation product of adipic acid and hexanediol in the mol ratio 4:5. In this case also, the caprolactone, which determines the properties of the final product, should comprise the major portion by weight of the polyester containing hydroxy groups. The diols and triols already mentioned above can be used as initiators. Butanediol-1,4; hexanediol-1,6; and, particularly, trimethyl hexanediol-1,6 are preferred.

If necessary, it can be of advantage to increase the viscosity of liquid types of polyesters containing hydroxy groups by reacting them with a less than stoichiometric quantity of an aromatic polyisocyanate, i.e., diisocyanate and/or triisocyanate, to form a prepolymer thereof according to (A)(4).

For forming the reactive adhesive compositions of the present invention, the polyester urethanes obtained in this fashion, which have terminal hydroxy groups, or the other polyester materials described above having terminal hydroxy groups, are mixed with at least an equivalent amount of an aromatic diisocyanate and/or triisocyanate, advantageously with an excess of up to about 50 percent of the isocyanate. Uncatalyzed, the solvent-free systems have a pot life of several hours, while the systems containing solvents have a pot life of a day or more.

These reactive adhesive mixtures are applied to one or both of the surfaces to be adhered and the surfaces are contacted, with or without the application of additional pressure. Pell strengths of up to 3.8 kilopounds per centimeter (kp/cm) are obtained. The materials may be applied per se as adhesives, or may first be dissolved in an inert solvent volatile at room temperatures. Suitable solvents are ketones, such as acetone or methyl ethyl ketone, or esters, such as ethyl acetate, with which aromatic solvents such as toluene or xylene can be admixed. Compositions or solutions having a viscosity suitable for applying them as coatings, by, e.g., painting, are preferred. While the mixtures can be used to adhere a wide variety of substrates, they are of particular utility for adhering flexible materials, such as rubbers or synthetic resin compositions such as plasticized polymers containing chlorine, particularly plasticized polyvinyl chloride, to each other or to other materials.

In a further embodiment of the invention, mixtures of (1) a prepolymer prepared from a polyester containing hydroxy groups [according to (A)(1) – (3) described earlier herein] with (2) a polyisocyanate are applied to suitable substrates as coatings or adhesives and are then cross-linked in situ. The prepolymers are prepared from an excess of the aforementioned polyesters and a polyisocyanate (diisocyanate and/or triisocyanate) such that the product has an hydroxy number of at least 25 – 30. This prepolymer is admixed with at least an equivalent amount of further polyisocyanate (diisocyanate or triisocyanate) to form the cross-linkable mixtures.

It is known in the art, for example from the "Kunstoff Handbuch, Vol. VII (Polyurethane)," K. Hanser Verlag, Munich, page 739, that linear adducts containing hydroxy groups and prepared from adipic acid/glycol polyesters and polyisocyanates can be used for coating textiles. The adducts or prepolymers in solution are cross-linked on the textile to be coated in the presence of a catalyst, such as an amine. As compared with these prior art adducts, the products of the present invention prepared with polyester-prepolymers containing caprolactone are superior from the point of view of (1) improved cold flexibility; (2) improved resistance to hydrolysis; (3) a lower viscosity at approximately the same molecular weight, whereby a smaller amount of solvent can be employed in preparing a solution of a desired viscosity.

Surprisingly, the adhesive mixtures of the present invention adhere rubbers in an exceptional manner, particularly vulcanized natural rubber and synthetic rubber-like polymers.

A better understanding of the present invention and of its many advantages will be had by referring to the following specific Examples, given by way of illustration. In the Examples, room temperature is approximately 20° C. Peel strength is measured according to DIN 53274.

EXAMPLE 1

86 g (0.1 mol) of poly-omega-hydroxy-caproic acid of a molecular weight of 860 are esterified with 6.7 g (0.05 mol) of hexanetriol-1,2,6 in the presence of 1 percent of p-toluene sulfonic acid (calculated on the weight of the combined reactants) over a period of 2 hours at 150° C. and at 40 mmHg. The unpurified polyester has an hydroxy number of 69 and an acid number of 0.6. A 60 percent solution of the polyester in ethyl acetate is prepared and is then mixed with a 50 percent excess (based on the hydroxy number) of a 75 percent solution, in ethyl acetate, of a triisocyanate prepared from 1 mol of trimethylolpropane and 3 mols of toluene diisocyanate. The adhesion of soft polyvinyl chloride (containing about 27 percent of plasticizer) with itself has the following peel strength (kp/cm) after complete hardening: at room temperature, 3.2 with failure of the material; at 50° C., 1.5.

EXAMPLE 2

49.6 g (0.04 mol) of poly-omega-hydroxy caproic acid of a molecular weight of 1240 are esterified with 6.4 g of 2,2,4-trimethyl hexanediol as described in Example 1 above. The polyester so obtained has a hydroxy number of 75 and an acid number of 0.5. A 60 percent solution of the polyester in ethyl acetate/acetone 1:1 is prepared and mixed with a 50 percent excess (calculated on the hydroxy number) of the solution of triisocyanate mentioned in Example 1. The adhesive compositions obtained in this manner are suitable for the adhesion of plasticized polyvinyl chloride.

The bonds so prepared show the following peel strengths (kp/cm) after complete hardening: at room temperature, 3.3 with failure of the material; at 50° C., 1.4.

EXAMPLE 3

Poly-omega-hydroxy caproic acid of a molecular weight of 1,240, adipic acid, and hexanediol-1,6 are esterified in a mol ratio of 1:1:2 as described in Example 1. The polyester so obtained has an hydroxy number of 53 and an acid number of 1.2. A 60 percent solution of the polyester in ethyl acetate/acetone 1:1 is prepared and treated as in Example 2. The bonds prepared showed the following peel strength (kp/cm): at room temperature, 3.6 with partial failure of the material; at 50° C., 1.5.

EXAMPLE 4

246 g (0.2 mol) of poly-omega-hydroxy-caproic acid of a molecular weight of 1,230 are esterified with 23.6 g of hexanediol-1,6 as described in Example 1. The polyester obtained has an hydroxy number of 77 and an acid number of 1.6 and is combined with a 50 percent excess of a 60 percent solution, in ethyl acetate, of the triisocyanate mentioned in Example 1.

The peel strength on soft polyvinyl chloride (approximately 27 percent plasticizer) was 4.5 kp/cm at room temperature, with failure of the material.

EXAMPLE 5

Poly-omega-hydroxy caproic acid of a molecular weight of 1,230, isophthalic acid, and hexanediol-1,6 are esterified in a mol ratio of 2:1:2 without a catalyst at 180° C. and under atmospheric pressure to an acid number of 4. The polyester obtained has an hydroxy number of 37. A 60 percent solution of the polyester in ethyl acetate is prepared and further treated according to Example 1. The adhesive bonds showed a peel strength at room temperature of 3.7 kp/cm. At 50° C., the value was 0.6 kp/cm.

EXAMPLE 6

A mixture of 37.5 g (0.125 mol) of 12-hydroxy-stearic acid and 114.1 g (1.0 mol) of epsilon-caprolactone is heated to 35° – 40° C. and then combined with 75 mg of antimony pentafluoride. The temperature of the reaction mixture remains for 40 minutes at 48° – 50° C. without cooling. Subsequently, this temperature is maintained for a further 2½ hours. The reaction product is taken up in methylene chloride and, for purification, is boiled under reflux with about 1 percent of montmorillonite and about 1 percent of active charcoal for 2 hours. The solution is filtered and reduced in volume to obtain a poly-omega-hydroxy caproic acid having an acid number of 44. Subsequently, the material is esterified with 14.8 g (0.125 mol) of hexanediol-1,6 in the presence of 1.7 g of p-toluene sulfonic acid over a period of two hours at 150° C. and 40 mmHg. The polyester so prepared has an acid number of 3.6 and an hydroxy number of 69. A 60 percent solution of the polyester and ethyl acetate is prepared and further processed as in Example 1. The following peel strengths (kp/cm) were measured on this product: at room temperature, 1.9 with partial failure of the material; at 50° C., 0.9.

EXAMPLE 7

190 g (1.67 mols) of epsilon-caprolactone and 39.4 g (0.334 mol) of hexanediol-1,6 are mixed and combined with 25 ml of benzene. The benzene is then distilled off until a temperature of at most 180° C. is reached, whereupon 0.05 percent of antimony pentafluoride as a polymerization catalyst is added at 40° C. The reaction mixture is stirred for 2 hours at 40° – 50° C. for completion of the reaction and then diluted with 50 ml of methylene chloride. This solution of the polyester is combined with about 1 percent of montmorillonite and about 1 percent of active charcoal, (calculated on the polyester) and boiled for 2 hours under reflux. The montmorillonite and active charcoal are filtered off and the methylene chloride removed. The fluid polyester prepared in this manner has an hydroxy number of 162 (calculated = 163) and an acid number of 1.6 and is combined with a 50 percent excess of a 75 percent solution, in ethyl acetate, of a triisocyanate prepared from 1 mol of trimethylol propane and 3 mols of toluene diisocyanate, without the addition of further solvent. Adhesive bonds of soft polyvinyl chloride (about 27 percent plasticizer) to itself showed the following peel strengths (kp/cm) at room temperature, failure of the material ensued; at 50° C., 2.2 with failure of the material.

EXAMPLE 8

11.25 g of butanediol-1,4 and 228 g of epsilon-caprolactone (mol ratio 1:16) are polymerized in the presence of 0.05 percent of concentrated sulfuric acid at 60° – 65° C. The reaction product has an hydroxy number of 54 and an acid number of 7.2. After purification, the polyester is dissolved in ethyl acetate (to give a 60 percent solution) and mixed with a triisocyanate formed from trimethylol propane and toluene diisocyanate, as in Example 1. The following peel strengths were measured (kp/cm): at room temperature, 3.5 with failure of the material; at 50° C., 0.5.

EXAMPLE 9

Trimethylhexanediol (a mixture of the 2,2,4- and 2,4,4-isomers) and epsilon-caprolactone are reacted at 30° – 35° C. in a mol ratio of 1:6 in the presence of 0.05 percent antimony pentafluoride. The materials are reacted for 2 hours. The polyester is taken up in methylene chloride and the solution is boiled under reflux for 1 hour after the addition of about 1 percent of montmorillonite and about 1 percent of active charcoal, calculated on the polyester. This solution is filtered and the solvent removed. The resulting polyester, which is liquid at room temperature, and has an hydroxy number of 131 (calculated = 133) and an acid number of 1.2. For the preparation of an adhesive mixture, the polyester is combined with a 50 percent excess, calculated on the hydroxy number, of a 75 percent solution in ethyl acetate of a triisocyanate prepared from 1 mol of trimethylol propane and 3 mols of toluene diisocyanate. The bonds of soft polyvinyl chloride (about 27 percent plasticizer) with itself showed the following peel strengths (kp/cm): at room temperature, 3.8; at 50° C., failure of the material.

EXAMPLE 10

The liquid polyester containing hydroxy groups described in Example 9 is warmed to 50° C. and then combined in a mol ratio of 2:1 with a mixture of 2,4- and 2,6-toluene diisocyanate (80:20). The mixture is reacted for 3 hours at 60° – 70° C. and the reaction product is kept for 1 hour at 70° C. under the vacuum produced by an aspirator. The prepolymer containing hydroxy groups prepared in this manner is a viscous liquid and has the following characteristics: hydroxy number = 51; acid number = 1.0.

This prepolymer was combined with a 50 percent excess (calculated on the hydroxy number) of the triisocyanate used in Example 1, or with a solvent-free liquid diisocyanate of the 4,4'-diisocyanato diphenylmethane type. Adhesive bonds on polyvinyl chloride showed the following peel strengths (kp/cm):

|  | 20°C. 3.1, with failure of the material | 50°C. failure of the material |
|---|---|---|
| with triisocyanate | | |
| with 4,4'-diisocyanato-diphenylmethane | | |
| on PVC (28% plasticizer) | 2.3 | 1.1 |
| on PVC (48% plasticizer) | 3.8 | 0.8 |

For purposes of comparison, a commercial polyester containing hydroxy groups and recommended for the adhesion of plasticized PVC was used formulate an adhesive. The polyester comprises adipic acid; propanediol-1,2; hexanediol-1,6; and trimethylolpropane and has an hydroxy number of 95 and an acid number less than two. Soft polyvinyl chloride (containing about 27 percent of plasticizer) was adhered with a combination of this polyester and a 50 percent excess, calculated on the hydroxy number, of a 75 prcent solution in ethyl acetate of a triisocyanate prepared from one mol of trimethylolpropane and three mols of toluene diisocyanate. The following separation values were observed (kp/cm): at room temperature, 2.2; at 50° C., 1.1.

EXAMPLE 11

87.0 g of an 80:20 isomeric mixture of 2,4- and 2,6-toluene diisocyanate are added over a period of 20 minutes at 50° C. to 456.5 g of the polyester prepared according to Example 9 from trimethylhexane diol (a mixture of the 2,2,4-and 2,4,4-isomers) and epsilon-caprolactone (sum of the hydroxy number and acid number = 135). The mixture was permitted to post-react for 3 hours at 70° C. During this time, portions of anhydrous ethyl acetate totalling 233 grams were successively added to lower the viscosity. In this manner, a 70 percent solution of a prepolymer was prepared.

20 grams of this solution were mixed with 0.975 g (corresponding to a 30 percent excess) of a 75 percent solution in ethyl acetate of a triisocyanate prepared from 1 mol of trimethylolpropane and 3 mols of toluene diisocyanate, and with one drop of a 33 percent solution of triethyl diamine in hexanetriol. The reaction mixture was coated onto a textile and heated at about 80° C. for about 20 minutes to effect cross-linking. A shiny tack-free coating was obtained which remained very flexible even at −20° C.

EXAMPLE 12

20.9 g of an 80:20 isomeric mixture of 2,4-and 2,6-toluene diisocyanate were added at 50° C. over a period of about 20 minutes to 273 g of a polyester having an hydroxy number of 61.6 comprising hexanediol-1,6 and epsilon-caprolactone. The mixture was allowed to react further for 3 hours at 70° C. Subsequently, 51.8 g of anhydrous ethyl acetate were added to lower the viscosity and to obtain an 85 percent solution of the prepolymer.

20 grams of this prepolymer solution were mixed with 1.32 grams (corresponding with a 30 percent excess) of a 75 percent solution in ethyl acetate of a triisocyanate prepared from 1 mol of trimethylolpropane and 3 mols of toluene diisocyanate. Proceeding further as in Example 11, a shiny, tack-free textile coating which is flexible even at −20° C. was obtained.

EXAMPLE 13

The liquid, solvent-free, prepolymer of Example 10 containing hydroxy groups was combined with a liquid, solvent-free diisocyanate of the 4,4'-diisocyanatodiphenylmethane type (50 percent excess calculated on the hydroxy number) to form an adhesive composition.

A second adhesive was prepared from the same solvent-free diisocyanate and the commerical polyester mentioned in Example 10. Both adhesives were tested for peel strength on a test rubber, "Noratest," prepared by C. Freudenberg KG., Weinheim, Germany:

|  | Peel Strength (kp/cm) | |
|---|---|---|
|  | Room Temperature | 50°C. |
| Adhesive of this invention | 9.2 | 1.2 |
| Prior art adhesive | 2.6 | 0.5 |

What is claimed is:

1. A method for adhering two materials which comprises contacting said materials after coating at least one of said materials with a reactive mixture comprising (A) a polyester containing hydroxy groups and having an hydroxy number from about 35 to about 190, and (B) an excess of up to about 50 percent, based on said hydroxy number, of an aromatic triisocyanate or of a mixture thereof with an aromatic diisocyanate, said polyester (A) being:
    1. formed between at least one alcohol having two or three hydroxy groups and
        a. poly-omega-hydroxy caproic acid, or
        b. epsilon-caprolactone and, as initiator, an aliphatic hydroxy-carboxylic acid or ester thereof, or
        c. mixtures of (a) or (b) with aliphatic or aromatic dicarboxylic acids;
    2. a polyester of poly-epsilon-caprolactone and, as initiator, at least one alcohol having two or three hydroxy groups;
    3. a mixture of polyesters (1) and (2);
    4. a prepolymer formed by reacting an excess of a polyester according to (1), (2), or (3), with an aromatic polyisocyanate.

2. The method as in claim 1 wherein at least one of said materials is a natural rubber, a synthetic rubber, or some other flexible synthetic resin.

3. A method as in claim 1 wherein at least one of said materials is a plasticized synthetic resin containing chlorine atoms.

4. A method as in claim 1 wherein at least one of said materials is plasticized polyvinyl chloride.

5. A method as in claim 1 wherein said polyester (A) has an hydroxy number from about 50 to about 160.

6. A method for adhering two materials which comprises contacting said materials after coating at least one of said materials with a reactive mixture comprising (I) a prepolymer containing hydroxy groups and having an hydroxy number of at least about 25 – 30, (II) an excess of up to about 50 percent, based on said hydroxy number, of an aromatic triisocyanate or of a mixture thereof with an aromatic diisocyanate, and (III) a catalytic amount of a catalyst for urethane-formation, said prepolymer (I) being the reaction product of an excess of (A) a polyester containing hydroxy groups and having an hydroxy number from about 35 to 190, with (B) an aromatic polyisocyanate, said polyester (A) being:
1. formed between at least one alcohol having two or three hydroxy groups and
   a. poly-omega-hydroxy caproic acid, or
   b. epsilon-caprolactone and, as initiator, an aliphatic hydroxy-carboxylic acid or ester thereof, or c. mixtures of (a) or (b) with aliphatic or aromatic dicarboxylic acids;
2. a polyester of poly-epsilon-caprolactone and, as initiator, at least one alcohol having two or three hydroxy groups; or
3. a mixture of polyesters (1) and (2).

7. A method for coating a material which comprises applying to said material a reactive mixture comprising (I) a prepolymer containing hydroxy groups and having an hydroxy number of at least about 25 – 30, (II) an excess of up to about 50 percent by weight, based on said hydroxy number, of an aromatic triisocyanate or of a mixture thereof with an organic diisocyanate, and (III) a catalytic amount of a catalyst for urethane-formation, said prepolymer (I) being the reaction product of an excess of (A) a polyester containing hydroxy groups and having an hydroxy number from about 35 to 190, with (B) an aromatic polyisocyanate, said polyester (A) being:
1. formed between at least one alcohol having two or three hydroxy groups and
   a poly-omega-hydroxy caproic acid, or
   b. epsilon-caprolactone and, as initiator, an aliphatic hydroxy-carboxylic acid or ester thereof, or
   c. mixtures of (a) or (b) with aliphatic or aromatic dicarboxylic acids;
2. a polyester of poly-epsilon-caprolactone and, as initiator, at least one alcohol having two or three hydroxy groups; or
3. a mixture of polyesters (1) and (2).

8. A method as in claim 7 wherein said material is flexible.

9. A method as in claim 8 wherein said material is a textile.

* * * * *